(12) United States Patent
Dern

(10) Patent No.: US 10,976,104 B2
(45) Date of Patent: Apr. 13, 2021

(54) MEANS AND METHODS FOR SELECTIVE SHELF TEMPERATURE CONTROL

(71) Applicant: SP Industries, Inc., Warminster, PA (US)

(72) Inventor: Charles D. Dern, Doylestown, PA (US)

(73) Assignee: SP Industries, Inc., Warminster, PA (US)

( * ) Notice: Subject to any disclaimer, the term of this patent is extended or adjusted under 35 U.S.C. 154(b) by 104 days.

(21) Appl. No.: 16/352,241

(22) Filed: Mar. 13, 2019

(65) Prior Publication Data

US 2019/0285341 A1 Sep. 19, 2019

Related U.S. Application Data

(60) Provisional application No. 62/642,767, filed on Mar. 14, 2018.

(51) Int. Cl.
| | |
|---|---|
| *F26B 5/04* | (2006.01) |
| *F26B 5/06* | (2006.01) |
| *F26B 23/10* | (2006.01) |
| *F16K 11/22* | (2006.01) |
| *F16K 11/074* | (2006.01) |
| *F16K 27/00* | (2006.01) |
| *F16K 31/06* | (2006.01) |
| *F16K 27/02* | (2006.01) |
| *F16K 11/065* | (2006.01) |

(52) U.S. Cl.
CPC ............ *F26B 5/044* (2013.01); *F16K 11/065* (2013.01); *F16K 11/074* (2013.01); *F16K 11/22* (2013.01); *F16K 27/003* (2013.01); *F16K 27/0263* (2013.01); *F16K 31/0627* (2013.01); *F26B 5/06* (2013.01); *F26B 23/10* (2013.01)

(58) Field of Classification Search
CPC .. F26B 5/044; F26B 5/06; F26B 23/10; F26B 3/20
See application file for complete search history.

(56) References Cited

U.S. PATENT DOCUMENTS

| | | | | |
|---|---|---|---|---|
| 1,737,259 | A * | 11/1929 | Miller | F26B 15/00 34/471 |
| 2,984,472 | A * | 5/1961 | Marks | D21F 5/02 432/135 |
| 3,287,815 | A * | 11/1966 | Yunghahn | D21F 5/00 34/309 |
| 3,461,953 | A * | 8/1969 | Wiegmann | F26B 5/044 165/244 |
| 4,018,244 | A * | 4/1977 | Burns | F16K 11/065 137/113 |
| 4,068,390 | A * | 1/1978 | Geshner | F26B 9/06 34/239 |

(Continued)

FOREIGN PATENT DOCUMENTS

CN 202274717 U 6/2012

*Primary Examiner* — David J Laux
(74) *Attorney, Agent, or Firm* — Lowenstein Sandler LLP

(57) ABSTRACT

A system including a fluid manifold and an article; the manifold having a length and a width and a plurality of inlet or outlet ports and the article comprising an element disposed within the manifold adapted for adjustable lengthwise movement within the manifold; and is suitably employed to adjust shelf temperature in for example a freeze-drying apparatus.

15 Claims, 4 Drawing Sheets

(56) References Cited

U.S. PATENT DOCUMENTS

| | | | | |
|---|---|---|---|---|
| 4,212,322 | A * | 7/1980 | Douglas | F16K 11/065 137/625.48 |
| 6,058,625 | A * | 5/2000 | Kieselbach | F26B 5/044 34/408 |
| 7,347,004 | B1 * | 3/2008 | Halvorsen | F26B 5/06 34/73 |
| 2009/0178293 | A1 * | 7/2009 | Corver | F26B 5/06 34/92 |

* cited by examiner

MEANS AND METHODS FOR SELECTIVE SHELF TEMPERATURE CONTROL

RELATED APPLICATIONS

This application claims priority to U.S. Patent Application No. 62/642,767, filed on Mar. 14, 2018, the entirety of which is incorporated by reference herein.

FIELD OF INVENTION

The disclosure relates to temperature control of shelves.

BACKGROUND

Freeze-drying (i.e. lyophilization or cryodesiccation) is a process for removing volatiles such as water or solvents from products. Freeze-drying has many applications such as preserving perishable materials, allowing for transport of certain materials, production of ceramics, production of products with short reconstitution times and acceptable potency levels, and the like. Freeze-drying is employed for a wide variety of materials, including, but not limited to food, pharmaceuticals and biological specimens.

In a typical freeze-drying process, samples, or vials or containers containing a sample, are loaded onto temperature-controlled shelves within a chamber and are cooled to low temperature until solidified. The chamber is then subjected to reduced pressure and the shelf temperature is adjusted to enable removal of a frozen solvent via sublimation in a step referred to as "primary drying". When sublimation is complete, the shelf temperature is raised during a "secondary drying" step to remove any additional solvent bound to the solid product e.g. by adsorption. When sufficient solvent is removed, the process is concluded. If samples are contained in vials or containers, the vials or containers are sealed, typically under sub-ambient pressure of inert gas.

Freeze-dryers generally contain a plurality of shelves onto which samples are loaded. The shelves may be cooled to below ambient temperature via flow of a heat exchange fluid through the shelves. Shelves may be cooled to temperatures for instance of from about 5° C. to, about −55° C. or colder. Cooling of a plurality of shelves during a loading process in which the shelves are exposed to ambient conditions of a loading area may result in undesired frost buildup on some or all shelves. Frost will act as an insulator and prevent proper heat transfer to a product vial or container. In addition, frost build-up can increase the amount of effort required to push product vials or trays onto a shelf. Increased force needed to move product onto shelves may adversely affect the performance of automatic loading systems. While there have been some designs that utilize valves for each shelf and fluid connection, these designs require a connection for each valve be extended through the pressure chamber in order to maintain process boundaries and cleanliness. Such methods increase the manufacturing cost and maintenance cost, while also add to the number of points of potential failure of the device. Desired are methods to cool shelves "just in time" before they are loaded, thereby reducing exposure time of a cold shelf to the atmosphere and minimizing the potential for frost buildup, while also doing so with fewer chamber penetrations.

SUMMARY

Accordingly, disclosed is a system comprising a housing defining a chamber; a plurality of horizontal shelves arranged vertically within the chamber, each shelf comprising an inlet, an outlet and a flow passageway disposed between the inlet and the outlet; a fluid manifold having a length and a width and in fluid communication with a respective flow passageway of each shelf; and an article comprising an element disposed within the manifold and adapted for adjustable lengthwise movement along the length of the manifold.

Also disclosed is a method of controlling a shelf temperature in a system comprising a housing defining a chamber; a plurality of horizontal shelves arranged vertically within the chamber, each shelf containing a flow passageway, an inlet and an outlet; a fluid manifold having a length and a width and in fluid communication with each shelf; and an article comprising an element disposed within the manifold and adapted for adjustable lengthwise movement in the manifold; the method comprising adjustably moving the element lengthwise within the manifold.

Also disclosed is a system comprising a fluid manifold having a length and a width and a plurality of inlet or outlet ports and an article comprising an element disposed within the manifold adapted for adjustable lengthwise movement within the manifold.

Also disclosed is a method of controlling fluid flow through a fluid manifold, the manifold having a length and a width and a plurality of inlet or outlet ports, wherein an element is disposed within the manifold and adapted for adjustable lengthwise movement within the manifold; the method comprising adjustably moving the element lengthwise within the manifold.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

This disclosure, in one example, relates to systems and methods for minimizing undesired frost formation on cooled shelves during loading of a freeze-drying process.

A freeze-drying process includes at least a freezing stage, a primary drying (i.e. sublimation) stage and a secondary drying (i.e. desorption) stage. During the freezing stage, a product is frozen and solvent crystals are formed in the product. During the primary drying stage, solvent is removed from the product by sublimation of free solvent by an increase in temperature and reduced pressure. During the secondary drying stage, the temperature is raised higher to remove bound solvent from the product. The solvent, or volatiles, in general comprise water.

Chambers of freeze-dryers in general contain a plurality of shelves, which are adapted with a cavity, i.e. flow passageway, to pass through a heat exchange fluid for temperature adjustment. Embodiments of the invention relate to systems and methods for control of shelf temperatures.

Figure 1:
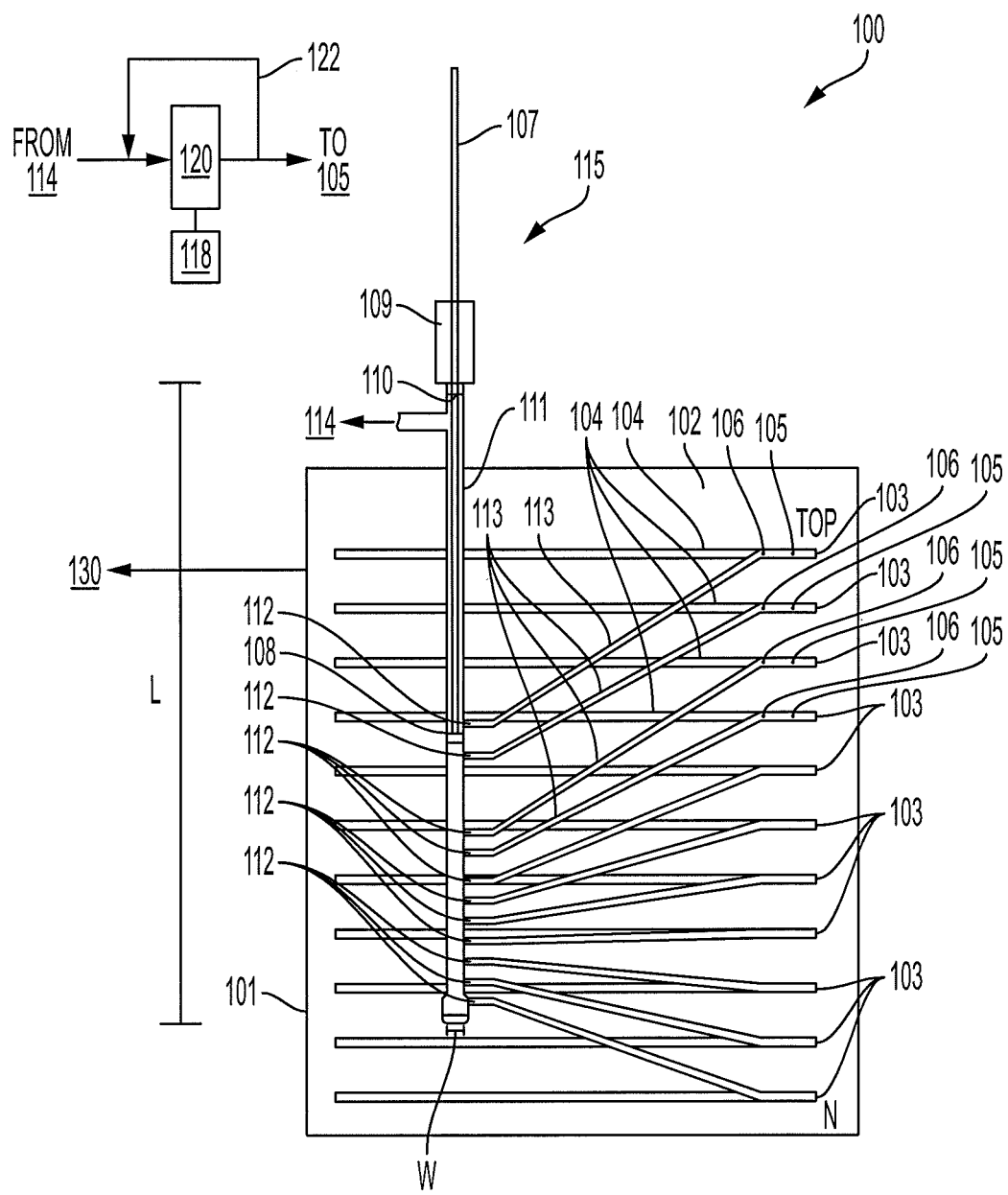
FIG. 1 shows a freeze-drying system according to disclosed embodiments.

FIG. 1 is a depiction of a freeze-drying system 100 according to an embodiment of the invention. The system contains a housing 101 defining a chamber 102 containing a plurality of horizontal, vertically arranged shelves 103. While only eleven shelves 103 are shown in the figure, it should be understood that more or less shelves 103 may be used. Each shelf 103 contains a flow passageway 104, an inlet 105 and an outlet 106. The shelf inlet 105 and outlet 106 locations are shown for some of the shelves 103, but it should be understood that each shelf 103 will have an inlet 105 and an outlet 106 for a respective flow passageway 104 even though they are not explicitly shown here. Shelf inlets 105 and outlets 106 may be aligned with each other as shown here, but need not be. The inlets 105 and outlets 106 may be at any location along the flow passageways 104 in fluid communication with each other and the flow passageways 104, respectively. For example, the 105 may be on an opposite site of the shelf 103 from inlet 106. The system contains an article 115 comprising an element having a rod 107 affixed with a stopper 108, a means 109 of moving the rod and stopper and a seal 110. The rod 107 affixed with the stopper 108 is disposed in a fluid manifold 111. The manifold 111 has ports 112, each associated and in fluid communication with a corresponding shelf 103 through tubes 113, which may also be any other type of piping of a suitable material and size to carry a heat exchange fluid. The stopper 108, as shown in FIG. 1, is in a fully retracted position. In this stopper 108 position, heat exchange fluid flow is allowed through only a top shelf 103 and an upper portion of manifold 111. The manifold 111 is in fluid communication with the shelves.

FIG. 1 depicts the manifold 111 being connected through tubes 113 to outlets 106, such that fluid flows from inlets 105 through the flow passageways 104 in the shelves 103 to the outlets 106 and then to the manifold 111 exiting at 114. Not shown is a tube or fluid connection from heat transfer fluid pump 120 (discussed below) to inlets 105. In an alternative embodiment, the manifold 111 may be connected through tubes 113 to inlets 105, such that fluid flows from 114 (reversing the 114 arrow), through the manifold 111, through the tubes 113, through the inlets 105, through the flow passageways 104 to outlets 106, which would then flow back heat transfer fluid pump 120.

Figure 2:
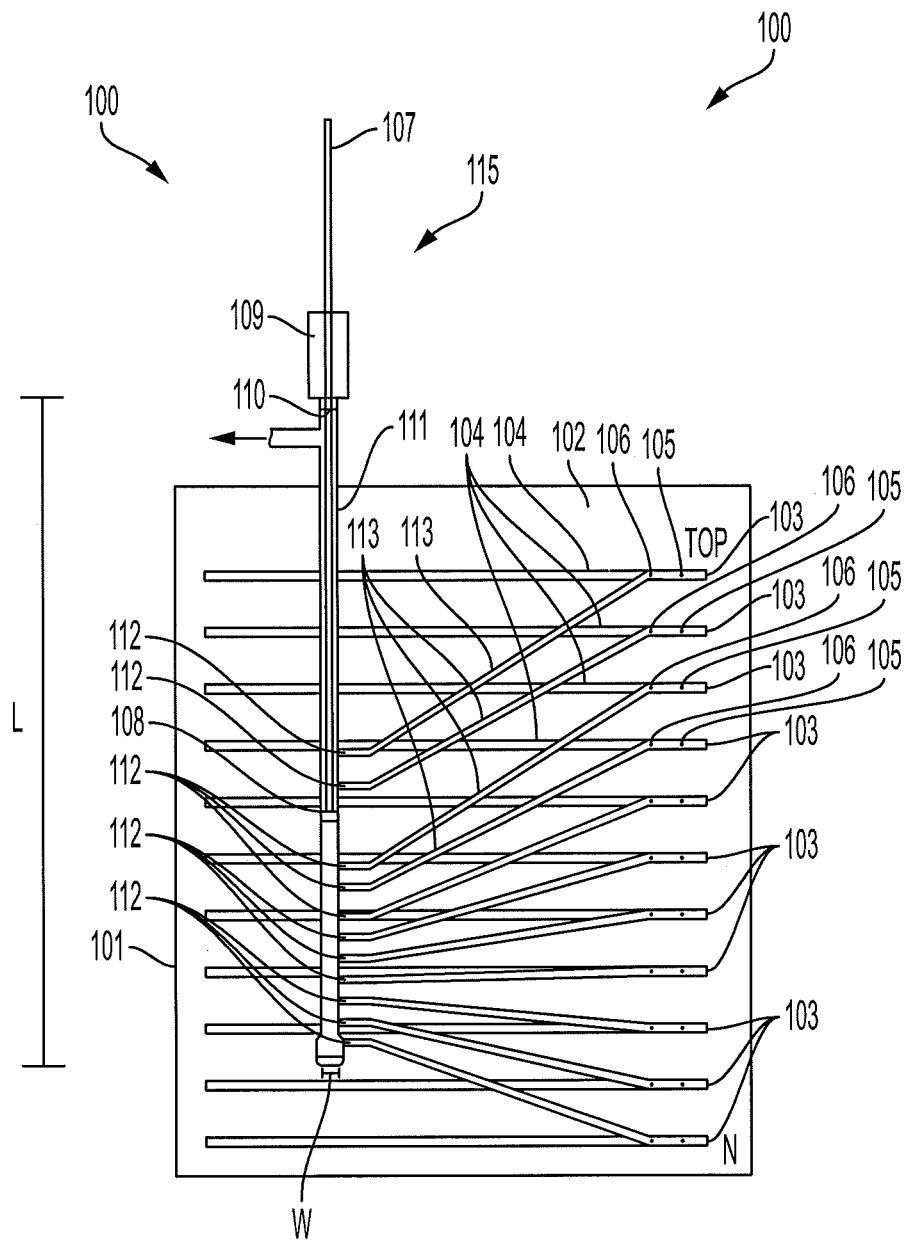
FIG. 2 shows the freeze-drying system of FIG. 1 in another stage of operation in accordance with disclosed embodiments.

FIG. 2 depicts the freeze-drying system 100, for example that shown in FIG. 1, according to an embodiment of the invention. In FIG. 2, the stopper 108 is in a partially inserted position. In this stopper position, flow of a heat exchange fluid is permitted through the top two shelves 103 and the manifold 111. Flow of a heat exchange fluid through the remaining shelves and the bottom portion of the manifold is blocked by the stopper 108.

Figure 3:
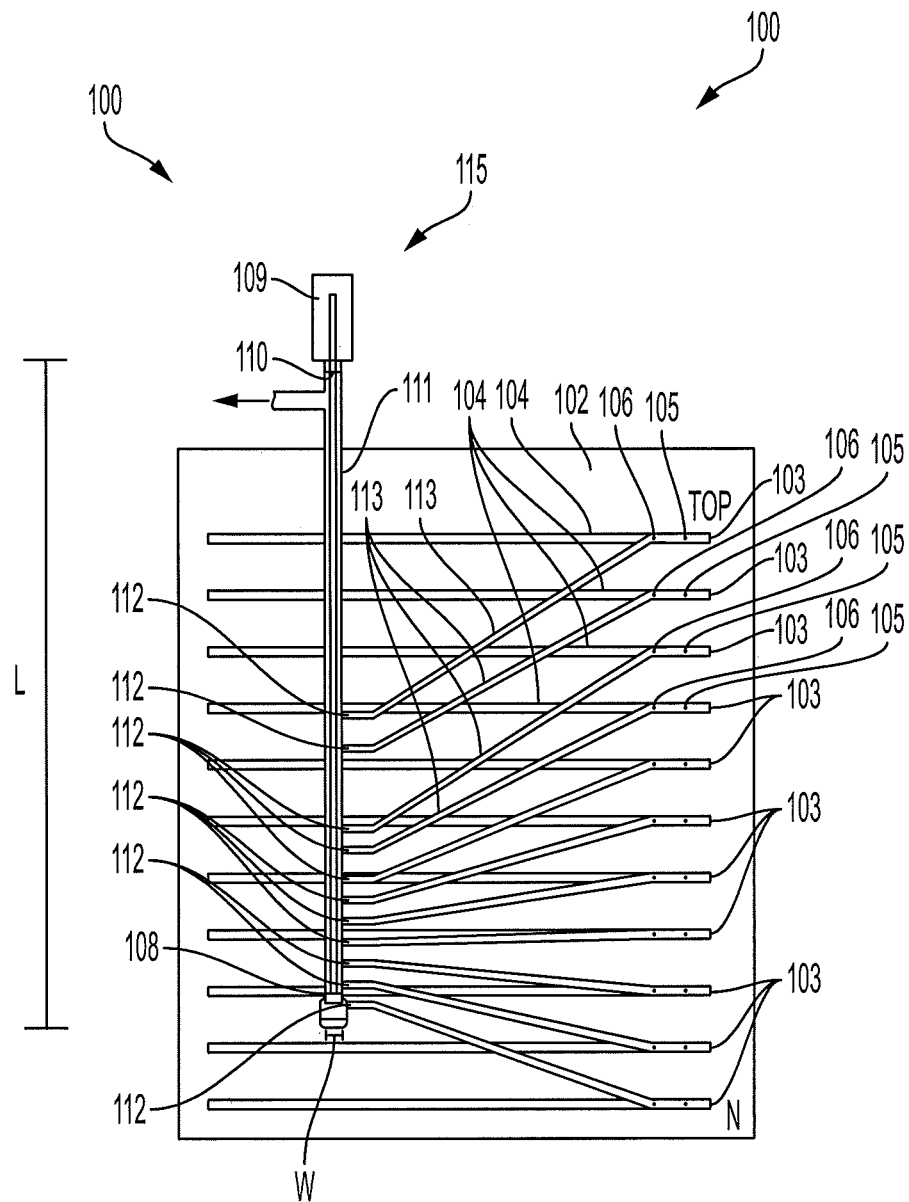
FIG. 3 shows the freeze-drying system of FIG. 1 in another stage of operation in accordance with disclosed embodiments.

FIG. 3 depicts the freeze-drying system 100, for example that shown in FIGS. 1 and 2, according to an embodiment of the invention. In FIG. 3, the stopper 108 is in a partially inserted position, which is more fully inserted than as shown in FIG. 2. In this stopper position, flow of a heat exchange fluid is permitted through all shelves 103 and the manifold 111 except the bottom shelf 103, shelf N. Flow of a heat exchange fluid through the bottom shelf 103 and the bottom portion of the manifold is blocked by the stopper 108.

Figure 4:
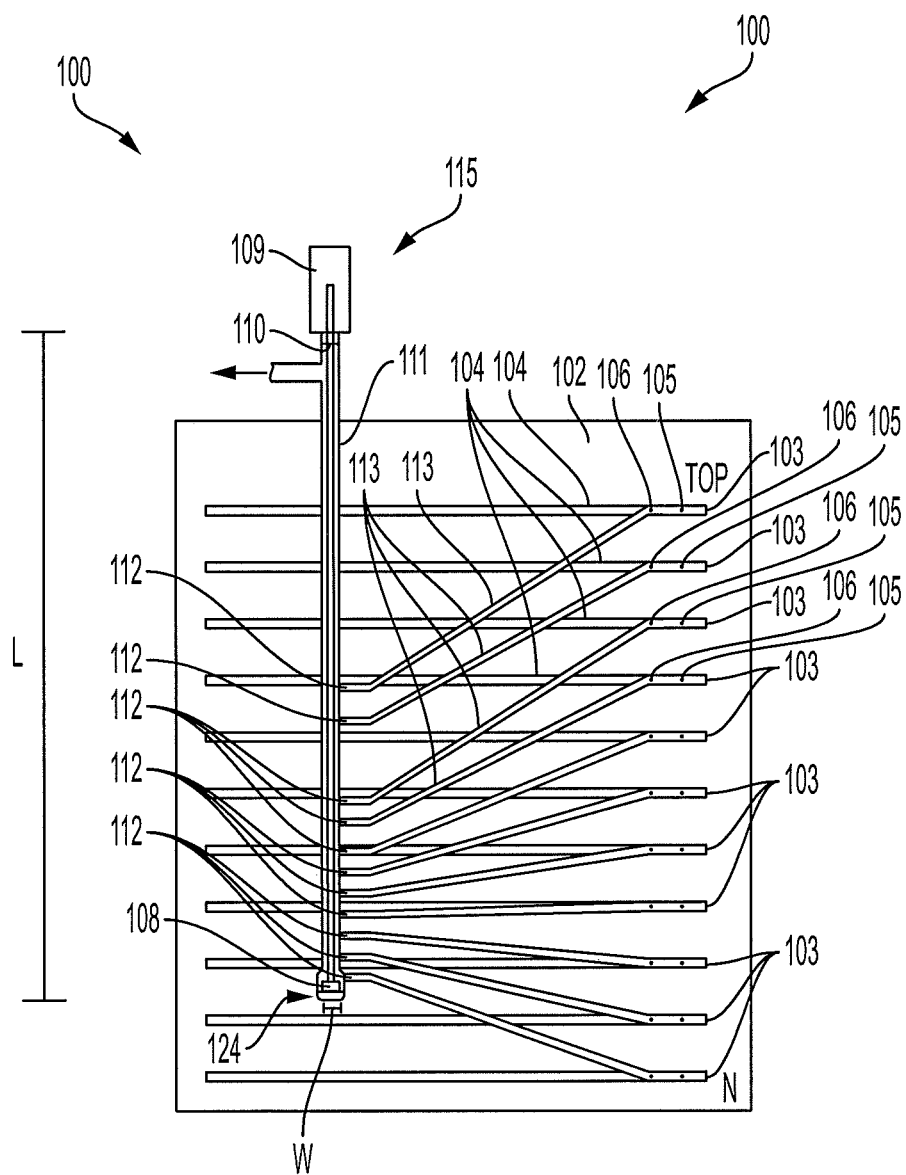
FIG. 4 shows the freeze-drying system of FIG. 1 in another stage of operation in accordance with disclosed embodiments.

FIG. 4 depicts the freeze-drying system 100, for example that shown in FIGS. 1-3, according to an embodiment of the invention. In FIG. 4, the stopper 108 is in a fully inserted position. In this stopper 108 position, flow of a heat exchange fluid is permitted through all shelves 103 and the entirety of the flow portion of the manifold 111.

The freeze-drying system 100 of FIGS. 1-4 may have additional elements in addition to a plurality of shelves 103 and a chamber 102, for instance a refrigeration unit, a vacuum system, fluid lines or hoses, gas lines, etc. The chamber may be accessible via a door or doors which may seal the chamber and allow it to sustain vacuum conditions. The chamber may comprise one or more inlets and/or outlets to facilitate gas flow, liquid flow or to connect to a vacuum source.

In some embodiments, the freeze-drying system may be adapted to perform steam sterilization cycles. The freeze-drying system may be adapted to perform clean-in-place (CIP) and/or a steam sterilization (SIP) cycle after each use to ensure a product is not contaminated by a previously lyophilized material. For example, in certain embodiments, the freeze-drying system may include one or more inlets for introducing cleaning media and/or steam into a chamber. The chamber may contain a drain to remove excess water.

The chamber may include one or more orifices for connecting to various valves and gauges. For instance, a gauge, such as a Pirani gauge, may be coupled to a chamber to measure the pressure within the chamber.

In some embodiments, the shelves may be thermally coupled to a heating element. A heating element may be an electric heating device. In some embodiments, a heating element may be one or more fluid lines thermally coupled to the shelves.

In certain embodiments, the freeze-drying system may include a condenser, which may be contained within the housing. In other embodiments, the system may comprise an external condenser. In such embodiments, condensing plates or coils may be disposed proximate within chamber 102, a separate condensing chamber or a conduit connecting the chamber 102 to the condensing chamber. If the orifices are on the condensing chamber or in a conduit between an isolation valve and the condensing chamber, then the isolation valve separating chamber 102 and the condensing chamber will be opened to achieve identical pressures between the two. In some embodiments, more than one chamber 102 may be connected to a single condensing chamber and vice versa.

In some embodiments, the freeze-drying system may include a control interface, which may allow a user to program a series of steps and cause the steps to be executed. The freeze-drying system may include various control hardware (e.g., one or more processing devices) and software systems adapted to command and coordinate the various elements of the system/apparatus and carry out a pre-programmed freeze-drying cycle. Various control hardware and software systems may also provide documentation, data logging, alarms and system security capabilities as well. In addition, auxiliary systems to the freeze-dryer system may include a leak check system, performance check system and various subsystems to clean and sterilize the product chamber and/or auto-load/unload the product in the product chamber, as well as associated mechanical or cryogenic refrigeration system accessories such as refrigeration skids, compressors, condensers, heat exchangers, heat transfer fluid systems, pumps, heaters, expansion tanks, cryogen tanks, piping, flow controllers/regulators, valves, sensors, etc.

Disclosed herein are methods of controlling shelf temperatures in a system such as freeze-drying system 100. The product to be chilled is first loaded onto the shelves, e.g., shelves 103 (FIG. 1). During the loading of the product, the present system may minimize frost buildup on the product shelves. Shelves generally are loaded starting with the topmost (first) usable shelf (the very top shelf generally is for radiant heat transfer only). During the loading of the first shelf, the stopper 108 is positioned to allow heat transfer fluid flow through the radiant (very top shelf 103) and first shelves 103 only. Upon completion of loading of the first shelf (or at a point during the loading of the first shelf), the stopper element moves or is moved to allow fluid flow through the second shelf. This process repeats until all shelves have been loaded. By limiting the duration that an unloaded shelf is chilled, frost buildup can be minimized, which leads to increased heat transfer efficiency.

After the product has been loaded, the shelves generally are held at the cold temperature and/or cooled further to induce nucleation of the product (freezing). The shelf temperature may be held at relatively cold values (e.g. about −50° C.) for a period of time to ensure that all of the product has frozen completely. However, the temperature at which the product is held may depend on the specific product and desired cooling.

After freezing of the sample is complete, drying steps are initiated which include a primary drying step and secondary drying step. Primary drying involves activating a vacuum pump and condenser refrigeration system to establish the desired sublimation and condensing conditions in the chamber 102. In some embodiments, a small bleed flow of a gas (e.g., an inert gas) may be fed into the chamber throughout the drying process to help control the vacuum level. After the vacuum pressure conditions are attained, the shelves are warmed (e.g., using an electric heater) to the desired primary drying temperature, which is dictated by the thermal, mechanical, chemical and/or biological properties of the material undergoing freeze-drying. Primary drying is completed when all the unbound water has been removed by sublimation, as determined by one or more of product temperature measurements, humidity measurements, comparison of capacitance manometer and Pirani gauge measurements, analysis of samples obtained with a sample thief, or other techniques. Once primary drying is complete, the freeze-dryer shelf temperatures are further warmed at a desired warming rate until the product or materials reach a temperature where desorption of bound water may be adequately achieved. This final product temperature depends on product composition and could be about 20° C. or higher. After drying is complete, the product or material is removed from the chamber 102. At any time during the process, the freeze-drying system may be capable of emergency stop or shutdown, which would close pressurization and depressurization control valves while the chamber remains under vacuum.

Shelves 103 are adapted with a cavity, i.e. flow passageway 104, to pass through it a heat exchange fluid for temperature adjustment. The flow passageway may advantageously have a serpentine shape or other shape to increase the heat transfer area between the fluid and the shelves 103. The fluid may be an aqueous or non-aqueous, for instance water, glycol, a glycol/water mixture or a silicone oil. Glycol includes ethylene glycol and propylene glycol.

The manifold 111, whether it be configured as an inlet manifold or an outlet manifold, will have a length L and a width W, the width being the longest radii of the manifold, e.g, near the ports 112. In some embodiments, the manifold may have a shape that is cylinder-like or rectangular box-like. The manifold 111 will have a number of ports 112, which function as an inlet or outlet for the manifold depending on the configuration of the manifold 111. Each port 112 is associated with a shelf outlet 106 or an inlet 105 via, for example a tube, hose, or a pipe 113. The manifold inlets or outlets are orifices or ports 112 for fluid flow. A fluid manifold 111 may have from 2 to 25 or 30 ports or more, for example 2, 3, 4, 5, 6, 7, 8, 9, 10, 20, 25 or 30 ports depending on the number of shelves 103 in the system 100. The inlet or outlet manifold ports 112 may or may not be uniformly spaced apart.

The article 115 includes, in one example, an element or rod 107 with stopper 108, disposed in the manifold is adapted for adjustable lengthwise movement in the manifold 111. In some embodiments, the article 115 comprises a rod 107 with a stopper 108 or "plunger" fixed to the end of the rod 107 within the manifold 111. This arrangement is not unlike a piston in a cylinder. The stopper 108 may have any shape suitable to produce the desired effect of preventing fluid flow through the manifold 111 at the location of the stopper. In some embodiments, the stopper 108 may have a disc shape, a ball shape, a spheroid shape, a piston shape, etc. In some embodiments, a diameter of the stopper 108 is slightly smaller than the interior diameter of the manifold 111, enabling the stopper 108 to be adjustably moved within the manifold 111 and also prevent fluid flow in the manifold 111. As the stopper 108 is moved up or down (or sideways if the manifold was similarly mounted) within the manifold, that is, retracted or inserted, fluid flow is enabled (allowed) or is prevented (disallowed) through one or more particular shelves 103. In one example embodiments, the system 100 comprises an article 115 disposed in an outlet manifold, in an inlet manifold, or in both manifolds.

In one example the system 100 will include an inlet manifold and an outlet manifold, with the inlet manifold coupled to the shelf inlets and with the outlet manifold coupled to the shelf outlets. One or both of the inlet and outlet manifolds may be like manifold 111 having an article 115.

When fluid flow is prevented through one or more particular shelves 103, those shelves 103 remain in fluid communication with the manifold 111, but the liquid cannot flow through those shelves 103. This is illustrated in the figures. As the stopper 108 travels farther into the manifold 111, flow is enabled to each shelf 103 one-by-one. For example, for an system 100 containing 5 shelves 103, in a fully retracted position, flow is enabled to only a first (top) shelf 103. The stopper 108 may be partially inserted to a next position to enable flow to the first two shelves 103. The stopper 108 may be partially inserted to allow liquid flow to the first three or the first four shelves 103. The stopper 108 may be fully inserted to allow flow to all 5 shelves 103.

The element disposed within the manifold may be associated with a suitable means of actuation 109. That is, the article 115 comprising the element also comprises a means of actuation 109, e.g. pneumatic or electric actuator, electric or hydraulic piston, rack and pinion, work gear, or other suitable device including manual means. The means of actuation 109 may be any suitable means adapted to move a rod 107 in a linear motion. The means of actuation may be in communication, e.g. electrical communication, with an automated loading device. The allowance of flow may be programmed to be timed to coincide with automatic sample loading through sub-doors or through a single door (not shown).

As fluid is not compressible, in one example the system 100 is designed to allow fluid to escape from below the stopper 108 as it is inserted past a bottom shelf's 103 connection port 112 to a manifold. This may be accomplished, for instance, by increasing the diameter of the manifold at a connection point for the last (bottom) shelf, for example at 124 (FIG. 4), such that the width of the manifold at 124 is greater than width W. In other stopper 108 positions, fluid may escape back through a shelf or shelves whose connection is below the stopper 108 position. All of the aforementioned are means of allowing escape of a fluid from below the element when the element is in an inserted position.

There might also be a change in flow path resistance as a stopper 108 is retracted or inserted; which change may be compensated for by any suitable means. In some embodiments, with reference to FIG. 1, this may be compensated by having a variable frequency drive 118 on a heat transfer liquid pump 120 and/or a bypass line 122 with or without suitable valve(s) or other fluid flow control devices. These are means of allowing escape of a fluid from below the element when the element is in an inserted position.

Present systems may therefore also comprise a means to adjust the flow rate of fluid supplied to a shelf or shelves. The means may comprise a bypass line 122 and/or a variable frequency drive 118 on a heat transfer fluid pump 120, or other fluid flow control device(s). An adjustable variable flow rate will allow for maintenance of heat transfer equilibrium (i.e. constant heat transfer fluid velocity in each shelf) among the shelves as each shelf is "opened" to the liquid. Maintaining consistent heat transfer fluid velocity will provide temperature uniformity across a shelf surface.

In some embodiments, the apparatus may contain from 2 to 25 or 2 to 30 shelves or more, for example 2, 3, 4, 5, 6, 7, 8, 9, 10, 11, 12, 20, 25 or 30 shelves or more. The shelves may in general be uniformly spaced apart, or not.

Present systems and methods are not limited to freeze-dryers or freeze-drying methods. For example, disclosed systems and methods are equally applicable to refrigerators and freezers without a separate vacuum or drying system. Disclosed systems may also be utilized in any other temperature control systems, including heating systems.

The term "system" may be synonymous with "apparatus" or "device" and may include an associated collection of elements, for instance elements selected from hardware, software and electronics. The terms "element", "article" and "member" may be synonymous and may themselves consist of a single element or may comprise more than one element. In general, a system may comprise one or more articles and an article may comprise one or more elements.

In some embodiments, vacuum conditions may be less than 1 millibar up to about 1000 millibar.

The term "configured" as used in the description and claims is intended to be an open-ended term as are the terms "comprising" or "containing". The term "configured" is not meant to exclude other possible articles or elements. The term "configured" may be equivalent to "adapted".

The term "associated" means for instance "equipped with", "coupled to", "connected to" or in "communication with", for example "electrically connected" or in "fluid communication with" or otherwise connected in a way to perform a function. The term "associated" may mean directly associated with or indirectly associated with, for instance through one or more other articles or elements.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by 5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0. In addition, a feature discussed with one figure or embodiment may also be used in combination with or in the alternative of another disclosed feature or embodiment as applicable.

Unless otherwise indicated, all parts and percentages are by weight. Weight percent (wt %), if not otherwise indicated, is based on an entire composition free of any volatiles, that is, based on dry solids content.

All U.S. patent applications, published patent applications and patents referred to herein are hereby incorporated by reference.

What is claimed as new and desired to be protected by Letters Patent of the United States is:

1. A system comprising
   a housing defining a chamber;
   a plurality of horizontal shelves arranged vertically within the chamber, each shelf comprising an inlet, an outlet and a flow passageway disposed between the inlet and the outlet;
   a fluid manifold having a length and a width and a plurality of inlet or outlet ports and in fluid communication with a respective flow passageway of each shelf; and
   an element disposed within the manifold and adapted for adjustable lengthwise movement along the length of the manifold.

2. The system according to claim 1, wherein the manifold is an outlet fluid manifold that is coupled to the outlets of each shelf.

3. The system according to claim 1, wherein the manifold is an inlet fluid manifold that is coupled to the inlets of each shelf.

4. The system according of claim 1, wherein the adjustable movement serves to allow or prevent flow of a heat exchange fluid through one or more of the shelves.

5. The system according to claim 1, wherein the element comprises a rod connected to a stopper, wherein the stopper is sized to prevent a flow of a heat exchange fluid through one or more of the shelves.

6. The system according to claim 5, wherein the element is connected to a means of actuation.

7. The system according to claim 6, wherein the element is associated with an automated or a manual sample positioning device.

8. The system according to claim 5, wherein
   if the element is in a fully retracted position, the flow of the heat exchange fluid is permitted through only a first of the plurality of horizontal shelves;
   if the element is in a fully inserted position, the flow of the heat exchange fluid is permitted through all of the plurality of horizontal shelves; or
   if the element is in a partially inserted position, the flow of the heat exchange fluid is permitted through more than one of the plurality of horizontal shelves and fewer than all of the plurality of horizontal shelves.

9. The system according to claim 5, wherein the element is adapted to being actuated into a position so as to prevent the flow of heat exchange fluid through a desired number of the plurality of shelves and to permit the flow of heat exchange fluid through the remaining number of the plurality of shelves.

10. The system according to claim 9, wherein the plurality of shelves is from 2 to 30 shelves, inclusive.

11. The system according to claim 1, further comprising at least one of bypass line, a variable frequency drive on a liquid pump, and a fluid flow control device.

12. The system according to claim 1, further comprising a vacuum source.

13. The system according to claim 1, wherein the system is a freeze-drying system.

14. A method of controlling a shelf temperature in a system comprising a housing defining a chamber;
   a plurality of horizontal shelves arranged vertically within the chamber, each shelf containing a flow passageway, an inlet and an outlet;
   a fluid manifold having a length and a width and in fluid communication with each shelf; and an element disposed within the manifold and adapted for adjustable lengthwise movement in the manifold;
   the method comprising adjustably moving the element lengthwise within the manifold.

15. The method according to claim 14, further comprising controlling fluid flow rate through the shelves by at least one of bypassing fluid around one or more shelves and adjusting a pump rate of the fluid.

* * * * *